SEARCH ROOM

RADIO DISPATCHING SYSTEM

INVENTORS
ANTONIO R. VALLARINO
SIDNEY W. LEWINTER
BY Percy P. Lantzy
ATTORNEY

RADIO DISPATCHING SYSTEM

Filed Jan. 24, 1952 2 Sheets-Sheet 2

INVENTORS
ANTONIO R. VALLARINO
SIDNEY W. LEWINTER
BY Percy P. Lantzy
ATTORNEY

Patented Aug. 3, 1954 2,685,642

UNITED STATES PATENT OFFICE 2,685,642

RADIO DISPATCHING SYSTEM

Antonio R. Vallarino, Waldwick, and Sidney W. Lewinter, Verona, N. J., assignors to International Telephone and Telegraph Corporation, a corporation of Maryland Application January 24, 1952, Serial No. 268,078

5 Claims. (Cl. 250—6)

This invention relates to radio dispatching systems and more particularly to systems for dispatching large fleets of vehicles, such for example, as taxi cabs, trucks and police cars.

Heretofore, radio dispatching has been used mostly by taxicab companies having fleets of less than 125 cabs. Beyond this point, the difficulties of dispatching cabs by radio multiply rapidly. The technical problems posed by these larger operations center about the dispatcher's capacity to retain large amounts of continually changing information and on the shortage of R. F. channel space allocations by the FCC to the taxicab industry. Under normal traffic conditions one dispatcher, unassisted, is capable of controlling a maximum of about 70 cabs. At the busiest times, such as on rainy days, this number shrinks to about 35 cabs. Large cities having taxicab fleets ranging from 350 to as high as 1300 require subdivision of the city into several dispatching areas in which each would handle approximately 35 taxicabs. In an efficient system for a fleet of 350 taxicabs, for example, a radio communication load would be divided into ten approximately equal parts in order to permit the handling of the necessary maximum volume of messages. The normal expected way to carry out this division of the load would be to use frequency allocation and to transmit over the entire city from ten base stations on ten different radio frequencies and have each one-tenth of the cabs receive and transmit on ten different frequencies. This method, however, is impractical, since it requires ten duplex channels, much more than the total number presently assigned to the Taxicab Radio Service by the Federal Communications Commission.

Another system that might be devised would be to divide the communication load by space allocation. One duplex channel would then be used with the city divided into ten areas in which the volume of cab business is approximately equal. By the use of selected transmitting sites and directional antennas, an attempt would be made to restrict the coverage of each base station to the assigned area. This method, however, would result in interference in the boundary zones between areas. The directional patterns of the antennas cannot be made sharp enough to prevent serious overlap, and furthermore, there would be reflections from buildings and other terrain that would produce interference zones.

One of the objects of this invention is to provide a substantially interference free radio dispatching system for vehicles applicable to large cities utilizing no more than three R. F. frequency channels, either single or duplex.

Another object is to provide a radio dispatching system based on a combination of frequency and area distribution whereby only three frequency channels, either single or duplex as may be desired, need be employed and wherein any one area served by one of the three frequency channels is contiguous only with those areas served by the other two frequency channels.

Important features of the invention comprise the manner of defining the dispatching areas and the allocation of the three channels. In one embodiment, the areas are arranged roughly in rows with the areas of each row staggered with respect to the areas of adjacent rows and the channels are then assigned to the areas of the several rows so that no area operating on one of the three channels is contiguous to another area operating on the same channel. In still another embodiment, one area is arranged centrally with the other areas arranged radially thereabout. By allocating one channel to the central area and by alternating the channels for the radial areas, no one area operating on a given channel is contiguous to another area operating on the same channel. By this combination of area arrangement and frequency allocation, substantially no interference is experienced between adjacent areas.

The above-mentioned and other features and objects of this invention and the manner of attaining them will become more apparent by reference to the following description taken in conjunction with the accompanying drawings, wherein.

Figure 1:
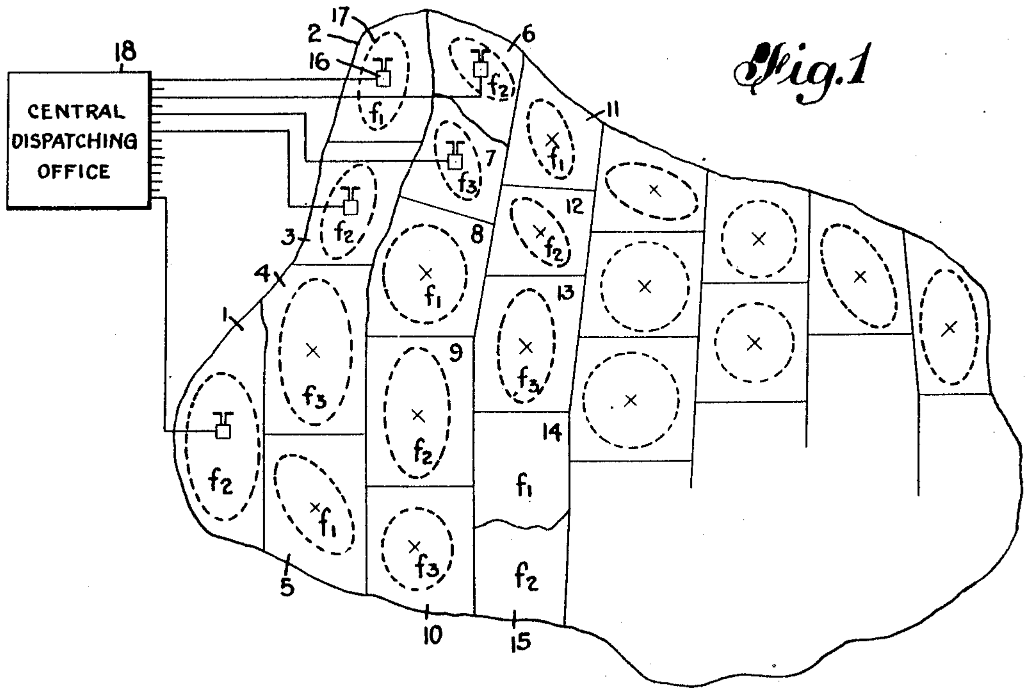
Fig. 1 is a plan view of a city or other large district subdivided into dispatching areas in accordance with one embodiment of this invention.

Referring to Fig. 1 of the drawing, we show a plan view of a district which may represent a large sprawling city, such as Philadelphia. The district is subdivided into dispatching areas arranged generally in rows with the areas of adjacent rows staggered substantially as indicated. The exact pattern of the dispatching areas are, of course, controlled in accordance with the street lay-out or traffic flow pattern, the topography including hills, cliffs, tall buildings and open spaces, such as rivers and parks, availability of base station sites and comparative cost. As shown in Fig. 1, the dispatching areas are consecutively numbered starting with area 1, which projects out in the lower left hand corner. The first group of dispatching areas following district 1 is shown arranged generally in a row as indicated by areas 2, 3, 4 and 5. The next row of dispatching areas 6 through 10, is so arranged that the dispatching areas thereof are staggered with respect to the dispatching areas of the first row. Likewise, the areas 11 through 15 of the third row are staggered with respect to the areas of the second row. This general pattern is followed throughout the entire district.

Each such dispatching area is provided with a base station as indicated at 16 for area 2 which has for its transmitter a radiation area following generally the outline of the dispatching area. This radiation pattern is generally shown at 17. If the area is approximately square, the radiation pattern may be substantially omni-directional, while if elongated, the pattern may be directional. The radiation pattern also depends on the location of the base station since should the best site be located at one end or corner of the area, the radiation pattern would best be directional. Each of the base stations preferably contain a transmitter and a receiver for communication with trans-receivers contained in vehicles being dispatched. These base stations are all connected to a central dispatching office 18 as indicated in Fig. 1 and in more detail in Fig. 3. The power of the transmitter at each base station is adjusted to confine the radiation to the desired area plus a small overlap into adjacent areas. The stations of the adjacent areas operate on different frequency channels so that overlap is permissible along the boundaries of adjacent areas. A mobile receiver in a boundary zone between adjacent areas can receive from either base station, but, of course, must be tuned for the desired frequency. This tuning is best accomplished by providing each vehicle with a multi-channel trans-receiver adapted to be switched directly from one frequency channel to another as the vehicle crosses a boundary.

The allocation of frequency channels for the base stations of dispatching areas follows a definite pattern. Assuming that area 2 is assigned channel $f_1$, area 3 is assigned $f_2$ and area 4 is assigned $f_3$, then the allotment repeats starting for area 5 with channel $f_1$ and so on for a row of dispatching areas. In the illustration of Fig. 1, area 1 will be assigned channel $f_2$ since it borders on areas 4 and 5 to which channels $f_3$ and $f_1$ have been assigned, respectively. The areas 6 through 10 of the second row are assigned channels as follows: area 6 will operate on $f_2$, area 7 on $f_3$, area 8 on $f_1$, area 9 on $f_2$ and area 10 on $f_3$. The areas 11 through 15 of the third row will be assigned channels to stagger with those of the second row. For example, area 11 will operate on $f_1$, area 12 on $f_2$, area 13 on $f_3$, area 14 on $f_1$, and area 15 on $f_2$. It will be readily observed that no one area operating on a given frequency channel is contiguous to another area operating on the same channel. For example, area 8 to which channel $f_1$ is assigned is surrounded by areas 7, 12, 13, 9, 4 and 3 which operate, respectively, on channels $f_3$, $f_2$, $f_3$, $f_2$, $f_3$ and $f_2$. Since the power of each station is limited to substantially the area to which it is assigned there will be little or no interference with an area operating on the same frequency channel some distance away. Since receivers are designed to operate on the stronger signals to the exclusion of weaker signals, this slight overlap may be disregarded.

The boundaries between areas are marked off on a map for each driver so that a driver in crossing an area boundary can notify his dispatcher and then switch over to the frequency channel, single or duplex as the case may be, of the next area. The dispatcher would then transfer the number of that vehicle to the dispatcher of the new area.

Figure 2:
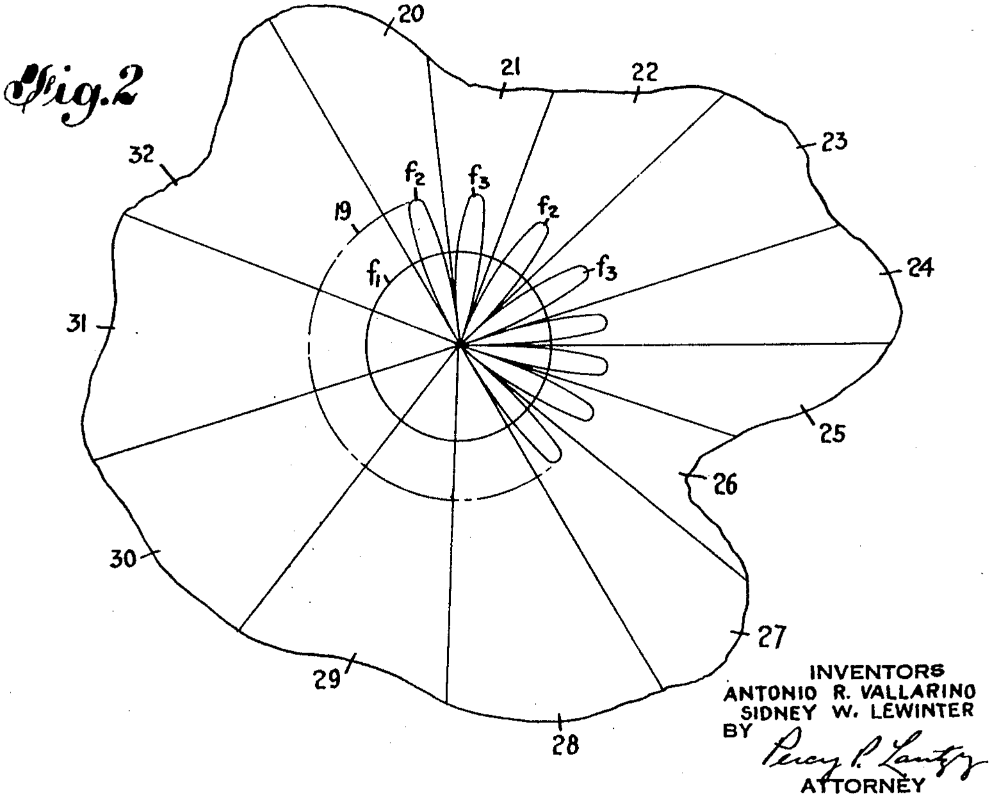
Fig. 2 is a plan view of another dispatching area arrangement and channel allocation according to a second embodiment.

In Fig. 2 another dispatching area arrangement and frequency allocation is shown which is particularly adaptable for city areas which are relatively flat and which do not have many tall structures. A typical example would be the city of Washington, D. C. The downtown section or hub of the city would comprise a central dispatching area as indicated at 19. The other areas would comprise radial portions located about the central area 19 as indicated by areas 20 through 32. The number of radial areas would depend upon the traffic density in different parts of the city. Those radial areas in which the traffic density are greater will comprise the smaller areas, whereas other areas having less traffic density would be the larger. The allocation of frequency channels would comprise the assigning of channel $f_1$ to the central area 19 and alternate the other channels $f_2$ and $f_3$ to the radial areas. By this arrangement of areas and allocation of frequency channels, no one area operating on a given channel is contiguous to other areas operating on the same channel.

The central area 19 would have an omni-directional radiation while the radial areas would have directional radiation patterns. While in Fig. 2 the base stations for all the areas are shown to be at a central point in the area 19, this need not be the case. It may be more desirable to locate the base station within the corresponding area and to provide directional radiation as required.

Figure 3:
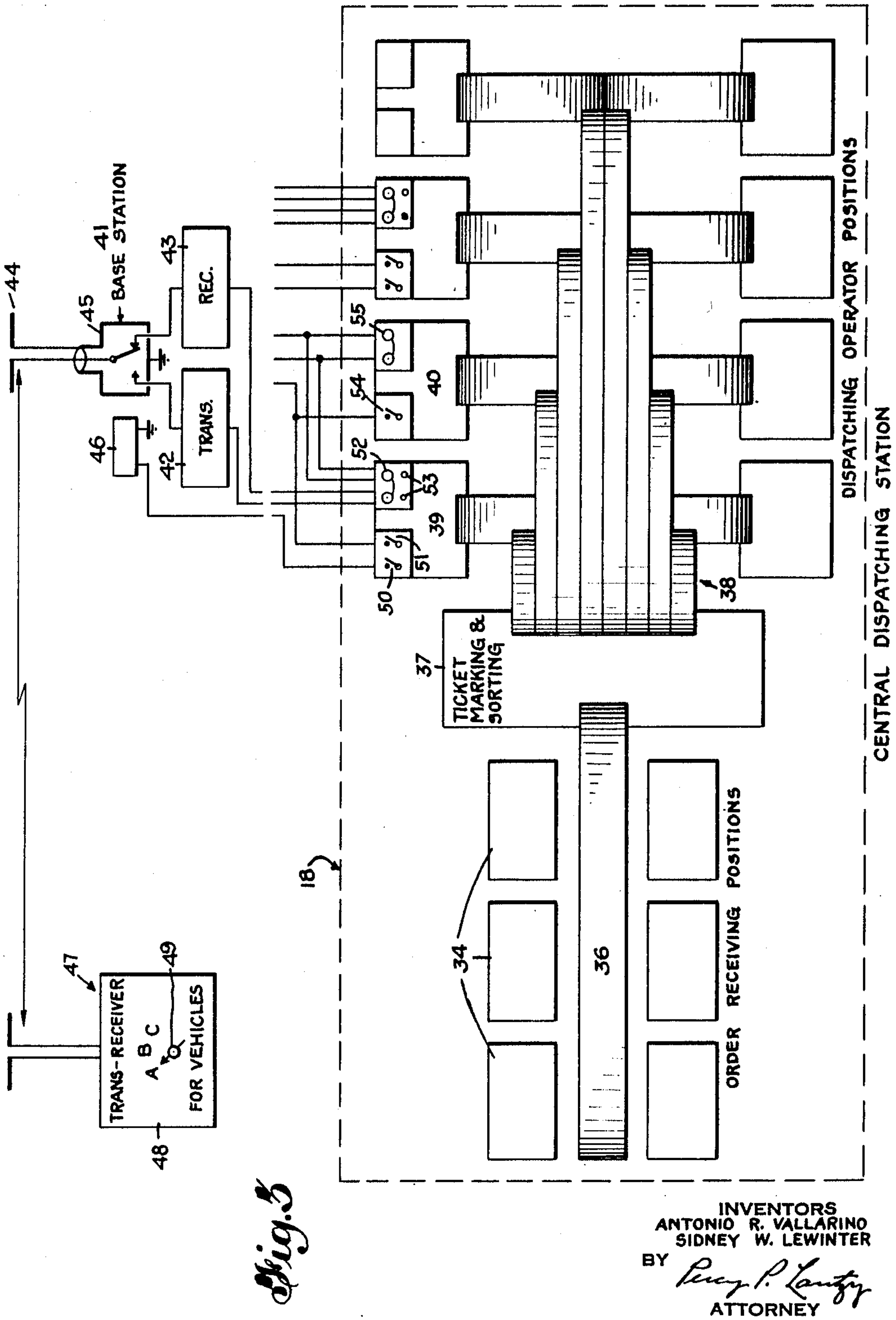
Fig. 3 shows a schematic block diagram of a dispatching office and connections for controlling the base stations of dispatching areas for dispatching vehicles containing trans-receivers in accordance with the principles of this invention.

Referring to Fig. 3, the central dispatching office 18 is shown as comprising a number of telephone operator positions 34 for taking messages and orders which are written on tickets and passed on to a conveyor belt 36 for conveyance to a ticket marking and sorting location 37. The tickets are placed on the appropriate one of a plurality of conveyors 38 whereby they are distributed to the proper operator dispatching positions, such as indicated by desks 39, 40.

The dispatching desks are preferably divided into two types, the double area type as indicated at 39 and the single area type as indicated at 40. The double type is provided for the handling of two dispatching areas, while the single type is provided for the handling of one area only.

A typical base station is indicated at 41 and comprises a transmitter 42 and a receiver 43. The transmitter and receiver may operate on a common antenna 44 although separate antennas may be provided if desired. Where a common antenna is provided, a relay switch 45 is provided which is controlled by a circuit 46. This use of a common antenna is suitable for single or duplex channel operation, the antenna reception pattern being substantially the same as for transmission even though the frequency used for transmission from the cab is different from the frequency used for transmission at the base station.

Typical mobile equipment such as indicated at 47 comprises a trans-receiver 48 having a channel control switch 49 whereby the trans-receiver may be switched from one to the other of the frequency channels, as indicated by switch positions A, B and C.

Referring back to the double desk 39, two switches 50 and 51 are provided for controlling the relay switches at the two dispatching areas assigned thereto. The desk is also provided with a telephone set 52 and a switch 53 for selective connection to the two base stations of the two areas assigned to that desk. The single desk 40 is provided with a single switch 54 to control the transmitter-receiver of the base station corresponding to the dispatching area assigned thereto and a telephone set 55 for operation over the transmitter-receiver system of that base station.

The purpose of the double dispatcher desk is to provide means for handling two dispatching areas from a single desk during normal periods. When rush periods occur, it is necessary to provide a dispatching operator for each area and during those periods the double area desk handles only one of the assigned areas.

In addition to the duplex operation of the communication system between dispatcher and driver of a vehicle, the system may include selective calling equipment whereby the dispatcher may call any one cab or group of cabs by operating a pushbutton control board. The call in that case would be heard only by the driver of the cab or cabs to which it is directed. Selective calling equipment is not essential to the operation of a communication system in accordance with the present area arrangement and frequency channel allocation, but may be used therewith if desired since it offers certain distinct advantages in communication of dispatching orders. For further information with regard to selective calling equipment, reference may be had to U. S. patents, Numbers 2,457,149, 2,480,115, 2,485,580, 2,524,782 and 2,531,416.

While we have described above the principles of our invention in connection with specific apparatus, it is to be clearly understood that this description is made by way of example only and not as a limitation to the scope of our invention, as set forth in the objects thereof and in the accompanying claims.

We claim:

1. A three channel radio dispatching system for vehicles in large districts requiring subdivision into a plurality of separate dispatching areas much greater in number than three, comprising a plurality of base stations one for each of the required dispatching areas, each base station having a transmitter and an antenna for transmission of signals over its respective area, said base stations being located to serve primarily separate but contiguous areas and the transmitter of each station being selectively arranged for operation on one of said three channels so that any one area served by a station operating on one of said three channels is contiguous only to areas served by stations operating on the other two of said three channels, a dispatching station having a plurality of dispatcher positions for operators, said dispatcher positions corresponding in number to the number of base stations, and means coupling each dispatcher position with the transmitter of a corresponding base station, the areas served by transmitters being arranged with one central area surrounded with radially disposed areas, the transmitter of the central area operating on one of said channels and the transmitters of the radial areas being arranged alternately for operation on the other two of said channels.

2. A three channel radio dispatching system according to claim 1, further including a plurality of vehicles each provided with a receiver and means selectively to switch said receiver to any of said channels.

3. A three channel radio dispatching system according to claim 1, wherein the means for coupling each dispatcher position with a transmitter includes means for coupling to at least certain of said dispatcher positions at least two of said transmitters.

4. A three channel radio dispatching system for large districts requiring subdivision into a plurality of separate dispatching areas much greater in number than three, comprising a plurality of base stations one for each of the required dispatching areas, each base station having a transmitter and an antenna for transmission of signals over its respective area, said base stations being located to serve primarily separate but contiguous areas and the transmitter of each station being selectively arranged for operation on one of said three channels so that any one area served by a station operating on one of said three channels is contiguous only to area served by stations operating on the other two of said channels, the areas served by transmitters being arranged with one central area surrounded with radially disposed areas, the transmitter of the central area operating on one of said channels and the transmitters of the radial areas being arranged alternately for operation on the other two of said channels.

5. A three channel radio dispatching system according to claim 4, wherein the station for the central area has an antenna for omni-directional radiation and at least certain of the stations of the radial areas have antennas for directional radiation.

References Cited in the file of this patent

UNITED STATES PATENTS

| Number | Name | Date |
| --- | --- | --- |
| 1,751,516 | Green | Mar. 25, 1930 |
| 1,772,165 | Taylor et al. | Aug. 5, 1930 |
| 2,419,593 | Robinson | Apr. 29, 1947 |
| 2,430,244 | O'Brien | Nov. 4, 1947 |